(12) United States Patent
Bachofer

(10) Patent No.: US 12,270,490 B2
(45) Date of Patent: Apr. 8, 2025

(54) ROTARY VALVE

(71) Applicant: MACK & SCHNEIDER GMBH, Filderstadt (DE)

(72) Inventor: Steffen Bachofer, Filderstadt (DE)

(73) Assignee: MACK & SCHNEIDER GMBH, Filderstatdt (DE)

( * ) Notice: Subject to any disclaimer, the term of this patent is extended or adjusted under 35 U.S.C. 154(b) by 19 days.

(21) Appl. No.: 17/756,098

(22) PCT Filed: Nov. 20, 2020

(86) PCT No.: PCT/EP2020/082859
§ 371 (c)(1),
(2) Date: May 17, 2022

(87) PCT Pub. No.: WO2021/099552
PCT Pub. Date: May 27, 2021

(65) Prior Publication Data
US 2022/0403952 A1    Dec. 22, 2022

(30) Foreign Application Priority Data
Nov. 22, 2019 (DE) .................. 10 2019 218 107.4

(51) Int. Cl.
*F16K 41/04* (2006.01)
*F16K 3/08* (2006.01)
*F16K 11/074* (2006.01)

(52) U.S. Cl.
CPC .......... *F16K 41/046* (2013.01); *F16K 11/074* (2013.01); *F16K 3/08* (2013.01); *F16K 11/0743* (2013.01); *Y10T 137/86863* (2015.04)

(58) Field of Classification Search
CPC ............ F01P 2007/146; F16K 11/0743; F16K 11/074; Y10T 137/86863; Y10T 137/86533
See application file for complete search history.

(56) References Cited

U.S. PATENT DOCUMENTS 4,398,562 A * 8/1983 Saarem ................. F16K 31/041
                                                                   318/47
9,410,628 B2 * 8/2016 Bachofer .................. F16K 1/32
(Continued)

FOREIGN PATENT DOCUMENTS

| CN | 109210236 A | 1/2019 |
|----|-------------|--------|
| CN | 208442317 U | 1/2019 |

(Continued)

OTHER PUBLICATIONS

International Preliminary Report on Patentability and Translation of Written Opinion for corresponding International Application No. PCT/EP2020/082859 dated Feb. 8, 2021.
(Continued)

*Primary Examiner* — Robert K Arundale
(74) *Attorney, Agent, or Firm* — Chrisman Gallo Tochtrop LLC

(57) ABSTRACT

The application relates to a rotary valve, in particular a multi-way regulating valve, with a housing, which has at least one inlet connection and at least one outlet connection for a liquid and/or gaseous medium, with at least one valve element, which is rotatably mounted in the housing between the connections in order to set at least one desired flow cross-section, and with a control shaft, which is non-rotatably connected to the valve element, which control shaft is led out of the housing with a coupling end, through an opening in a housing wall of the housing, wherein the control shaft has a radial projection, which has an axial stop for making axial contact with an annular sealing protrusion of the housing wall, and with at least one sealing element acting between the control shaft and the housing. It is provided that the annular projection of the control shaft has at least one axial recess on the end face thereof facing the housing wall, which axial recess extends over a limited circumferential section of the end face to the radial outer (Continued)

edge of the annular projection, and that a chamber is formed between the annular projection, the control shaft, the housing wall, and the sealing projection, in which chamber the sealing element is arranged.

13 Claims, 5 Drawing Sheets

(56) References Cited

U.S. PATENT DOCUMENTS

| | | | | |
|---|---|---|---|---|
| 9,638,340 | B2* | 5/2017 | Bachofer | F16K 11/0743 |
| 9,803,759 | B2* | 10/2017 | Bachofer | F16K 11/0743 |
| 10,920,894 | B2* | 2/2021 | Wu | F16K 27/045 |
| 10,941,871 | B2* | 3/2021 | Yu | F16K 27/048 |
| 11,207,945 | B2* | 12/2021 | Jiang | H02P 6/16 |
| 11,221,077 | B2* | 1/2022 | Park | F16K 17/048 |
| 11,319,863 | B2* | 5/2022 | Park | F16K 11/0873 |
| 2013/0081727 | A1* | 4/2013 | Sugie | F24H 15/305 |
| | | | | 137/862 |
| 2015/0233483 | A1 | 8/2015 | Bachofer | |
| 2019/0309859 | A1 | 10/2019 | Yu et al. | |

FOREIGN PATENT DOCUMENTS

| | | |
|---|---|---|
| DE | 36 15 229 A1 | 11/1987 |
| DE | 20 2012 012 981 U1 | 6/2014 |

OTHER PUBLICATIONS

International Search Report for corresponding International Application No. PCT/EP2020/082859 mailed Feb. 8, 2021.
Written Opinion for corresponding International Application No. PCT/EP2020/082859 dated Feb. 8, 2021.
Steinhilper et al., "Damage mechanisms and service life", Berlin Heidelberg, Springer, 2012; ISBN 3642243029 and English translation of p. 237.

* cited by examiner

ROTARY VALVE

FIELD OF THE INVENTION

The invention relates to a rotary valve, in particular a multi-way regulating valve, with a housing which has at least one inlet connection and at least one outlet connection for a liquid and/or gaseous medium, with at least one valve element which is rotatably mounted in the housing between the connections in order to set at least one desired flow cross-section, and with a control shaft which is non-rotatably connected to the valve element, which control shaft is led out of the housing with a coupling end, through an opening in a housing wall of the housing, wherein the control shaft has at least one radial projection inside the housing, which radial projection has an axial stop for making contact with the housing wall, and with at least one sealing element acting between the control shaft and the housing.

BACKGROUND OF THE INVENTION

Rotary valves of the type mentioned are known from the prior art. They are used, for example, in motor vehicles to regulate cooling water circuits or also in vending machines. For example, a disc valve is known from utility model DE 20 2012 012 981 U1. The control shaft is fixed axially in the housing in a form-fitting manner in at least one axial direction by the axial stop. The axial stop serves both as a bearing and as a seal between the housing and the control shaft, wherein the main seal is formed by a sealing element arranged coaxially as relates to the control shaft, thus preventing the medium to be regulated by the rotary valve from exiting the housing and reaching the environment of the rotary valve. In particular, leakage of the medium out of the housing is prevented by the sealing contact with the sealing element. The control shaft preferably rests on the sealing element so that it is pre-tensioned or kept elastically deformed between the axial stop of the control shaft and the housing wall. The maximum deformation of the sealing element is limited by a spacer arranged on the housing, which spacer is assigned to the radial projection.

BRIEF SUMMARY OF THE INVENTION

The object of the invention is to create an improved rotary valve which, on the one hand, reliably prevents liquid from escaping and/or the ingress of dirt particles and, on the other hand, ensures that the control shaft and thus the valve disc can be rotated easily and remain so.

The object is achieved according to the invention by means of a rotary valve having the features of claim 1. This has the advantage that, due to an advantageous design, the sealing element is always in contact with the medium to be conveyed or regulated and thereby does not dry out or become porous, and thus reliably fulfills its function over the long term. On the other hand, it is ensured that dirt particles do not reach the sealing element and thus do not permanently clog the sealing element and make actuation of the rotary valve more difficult.

According to the invention, it is provided that the annular projection rests, with end face thereof facing the housing wall, on an annular sealing projection of the housing, and has at least one axial recess which extends over a limited circumferential section of the end face to the outer circumference thereof, and that a chamber is formed between the annular projection, the housing wall, the control shaft, and the sealing projection, in which chamber the sealing element is arranged. The sealing element is thus located axially between the housing wall, on one side, and the annular projection, on the other. As a result, the sealing element can easily be pre-tensioned against the housing wall by the control shaft, in particular by the control shaft being assigned at least one spring element which applies a spring force to the control shaft in the direction of the housing wall. The sealing element can either rest directly on the end face of the annular projection facing the housing wall in some areas, or it preferably rests axially on an axial stop of the control shaft that is radially spaced apart from the annular projection, which axial stop is located axially between the annular projection and the housing wall. The chamber is limited radially by the control shaft, on one side, and the sealing projection of the housing, on the other. Due to the fact that the sealing projection is annular, i.e. has a closed ring shape, the sealing element is completely surrounded by the sealing projection over the circumference thereof so that the medium to be regulated can only flow into the chamber, in which the sealing element is arranged, through an axial gap between the sealing projection and the annular projection. For this purpose, the annular projection has the aforementioned at least one axial recess on the end face thereof facing the housing wall and thus on the end face facing the sealing projection. The axial recess ensures that the annular projection and the sealing projection do not form a continuous ring-shaped contact surface but are spaced apart from one another at least in sections. The axial recess means that the contact surface of the annular projection on the sealing projection is interrupted by the axial recess, as viewed in the circumferential direction, so that the aforementioned axial gap, through which medium enters the chamber with the sealing element, is ensured. The design of the rotary valve according to the invention thus enables, on the one hand, an advantageous axial contact of the control shaft on the sealing projection and, on the other hand, an advantageous media connection to the sealing element. The rotary valve is preferably designed as a disc valve or rotary piston valve, for which purpose the valve element is designed as a valve disc or valve piston.

According to a preferred embodiment of the invention, the end face of the annular projection has several axial recesses, in particular arranged evenly distributed with respect to one another. The several axial recesses ensure that the medium can flow into the chamber at several points, and that, at the same time, an advantageous contact of the annular projection on the sealing projection is ensured, in particular due to the evenly distributed arrangement. In particular, this reliably prevents the control shaft from tilting or jamming in the housing.

The annular projection preferably has at least three axial recesses which are arranged in an evenly distributed manner. The three axial recesses also result in three contact points so that a specific bearing of the control shaft on the sealing projection is ensured with an even distribution.

The annular projection especially preferably has four, in particular precisely four, axial recesses so that there are correspondingly four contact points through which the control shaft rests on the sealing projection by means of the annular projection. Due to the number and design of the axial recesses, the contact pressure exerted by the spring element onto the control shaft, against the sealing projection, can be advantageously distributed to the sealing projection and the annular projection. The annular projection therefore also optionally has more than 4 of the axial recesses. The respective axial recess expediently extends radially, at least in certain areas, up to the control shaft or to the base body thereof. This ensures that the gap formed by the axial recess leads into the chamber in which the sealing element is located. In particular, the outer diameter of the control shaft in the axial connection to the annular projection is designed to be slightly smaller than the inner diameter of the sealing projection, so that a fluid connection is reliably ensured from the chamber into the housing of the rotary valve.

The respective axial recess preferably has side edges limiting the axial recess in the circumferential direction, which side edges are aligned radially or practically radially in relation to the control shaft. The fact that the respective axial recess extends over a limited circumferential section of the annular projection means that the respective axial recess is limited in the circumferential direction by side edges. According to this embodiment, the side edges are aligned radially or practically radially, so that they form a right angle or practically a right angle with the casing wall of the control shaft. This alignment of the side edges provides for cost-effective production of the control shaft as a whole.

According to a further embodiment of the invention, it is preferably provided that the respective axial recess has side edges limiting the axial recess in the circumferential direction, wherein, in this case, the side edges deviate from a radial alignment in relation to the control shaft in such a way that they reduce the extension of the axial recess in the circumferential direction, in the direction of the control shaft. In particular, the side edges of the respective axial recess form an obtuse angle. The side edges of an axial recess thus approach one another in the direction of the control shaft, resulting in dirt-repelling bevels or vanes which, when the control shaft rotates, means that any dirt particles in the axial recess are better removed from the gap outwardly, i.e. are expulsed from the chamber with the sealing element. This ensures that no dirt particles or the like can settle permanently in the respective gap.

According to a further embodiment of the invention, it is preferably provided that the side walls extend in a straight line. This results in a simple contour and simple production of the control shaft.

Alternatively, the side walls preferably have at least one curvature. The curvature can optimize the expulsion of dirt particles.

Furthermore, it is preferably provided that the annular projection has at least one rotation stop, which is designed to interact with a housing-fixed stop to limit a rotational range of the shaft. The rotation stop therefore limits the angle of rotation or rotational range of the control shaft, so that the control shaft has a fixed form-fitting stop within the housing, which stop prevents the control shaft from rotating further. As a result, for example, a neutral position or initial position of the control shaft in the housing can be adjusted simply by moving the control shaft against the stop, and a malfunction or incorrect setting of the control shaft or of the valve disc connected to the control shaft is reliably prevented.

The rotation stop is especially preferably arranged between two of the axial recesses, as viewed in the circumferential direction. The rotation stop is thus located in the area of an elevation lying between two axial recesses, which elevation forms the axial stop of the annular projection on the sealing projection. The rotation stop is thus located in particular in the area of the annular projection that has the greatest material thickness so that a secure and robust function of the rotation stop is ensured. In particular, the rotation stop is connected to the annular projection and/or the control shaft as a single piece.

The rotation stop especially preferably protrudes radially beyond the annular projection. The rotation stop thus protrudes radially from the annular projection and thus interacts radially, outside of the annular projection, with the stop fixed to the housing. As a result, the functions of the annular projection and rotation stop are separated, and an optimal design of both is made possible.

The housing-fixed stop is especially preferably arranged on the housing wall, in particular formed with it as a single piece. This ensures a cost-effective and space-saving arrangement of the stop in the housing. The stop is especially preferably designed or arranged, outside the sealing projection, on the housing wall as an axial projection which projects in the direction of the annular projection of the control shaft. The one-piece design of the housing-fixed stop with the housing wall and a preferred one-piece design of the rotation stop with the annular projection ensure simple assembly and cost-effective production of the rotary valve. Optionally, the control shaft has several rotation stops, for example two, which interact with the one housing-fixed stop or with a respective housing-fixed stop.

As already mentioned, the rotary valve preferably has at least one spring element which applies a spring force to the control shaft in the direction of the housing wall. This ensures reliable guidance and arrangement of the control shaft in the housing and a sealing contact between the annular projection or the control shaft and the sealing element and/or the sealing projection.

BRIEF DESCRIPTION OF THE DRAWINGS

The invention will be explained in more detail below with reference to the drawing. To this end, the following is shown.

DESCRIPTION OF EXAMPLE EMBODIMENTS

Figure 1:
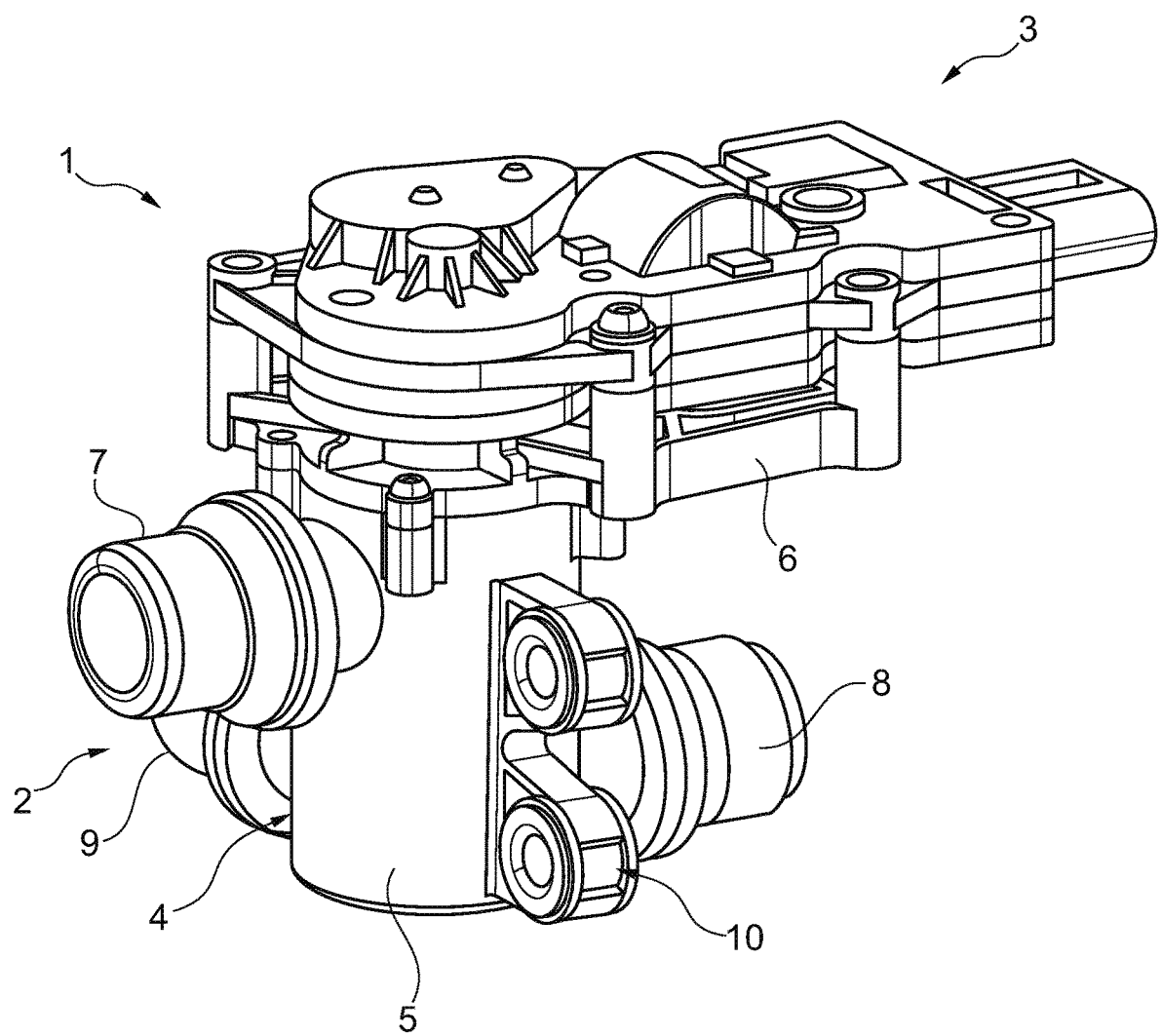
FIG. 1 an advantageous valve device with a rotary valve in a perspective view.

FIG. 1 shows a perspective view of a valve device 1 which has a rotary valve 2 designed as a disc valve and an actuator 3. The disc valve has a housing 4 which is formed by a distributor housing 5 and a cover 6. The distributor housing 5 has three connections, of which one is in the form of an inlet connection 7 and the other two are in the form of outlet connections 8 and 9, respectively. In addition, the distributor housing 5 has a holding device 10 for fastening the valve device 1, for example to the body of a motor vehicle.

The actuator 3 is mounted on the cover 6, which is designed in particular as an electromotive actuator 3 and, for this purpose, has an electric motor (not shown in detail) and a gear which can be coupled or is coupled to a control shaft of the rotary valve 2, which is explained in more detail below, in order to distribute a medium provided at the inlet connection 7, in particular a liquid, to the outlet connections 8, 9 as desired. For example, the valve device 1 is designed to be used in a cooling water circuit of an internal combustion engine of the motor vehicle in order to optimally distribute cooling water, for example to different cooling circuits, depending on the operating state of the internal combustion engine.

Figure 2:
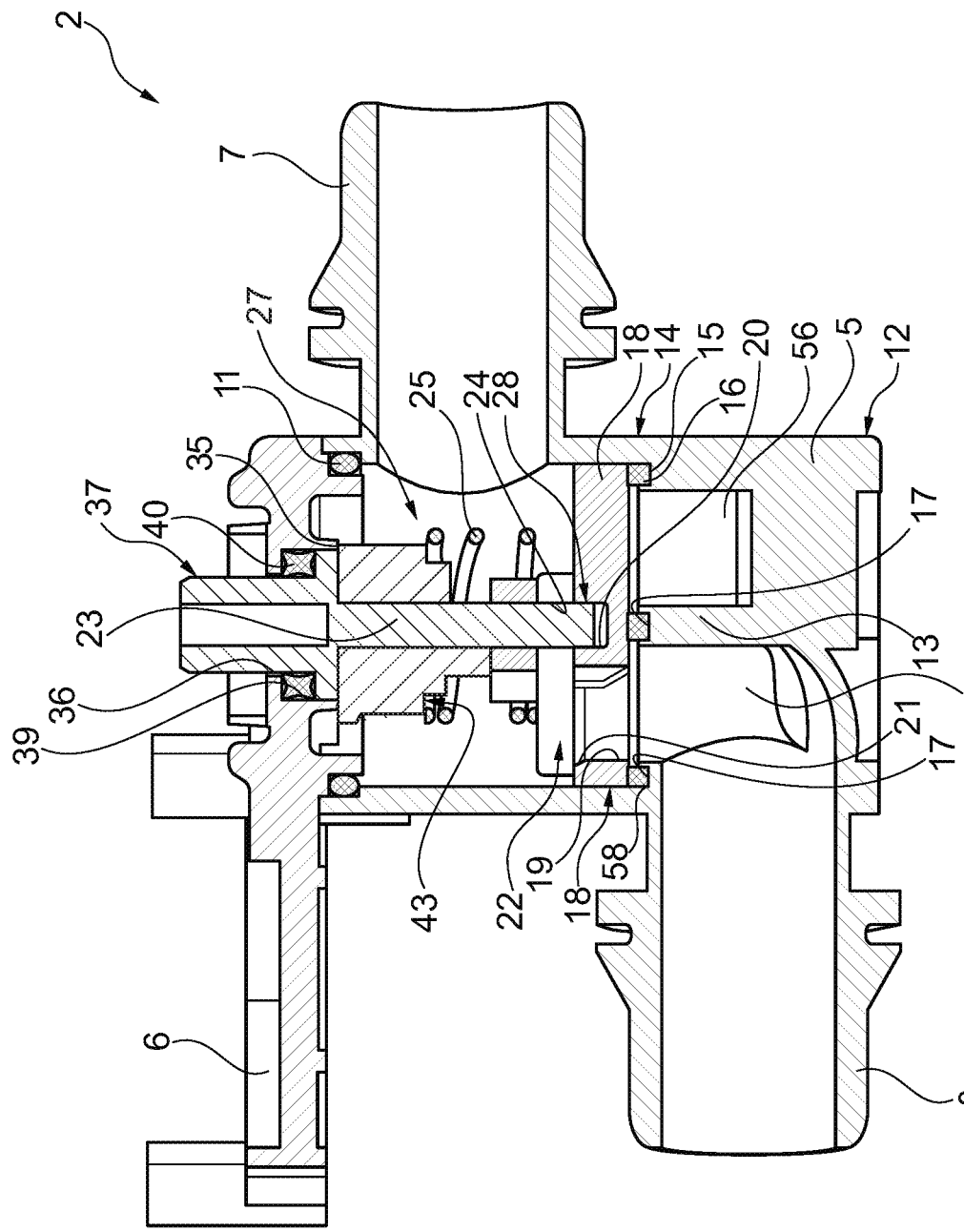
FIG. 2 the rotary valve in a simplified longitudinal sectional view.

FIG. 2 shows the rotary valve 2 in a longitudinal sectional view. The distributor housing 5 is essentially cup-shaped so that it has a U-shaped contour as viewed in the longitudinal section. In the present case, the connections 7, 8, 9 are formed with the distributor housing 5 as a single piece. The cover 6 closes off the open end of the cup-shaped distributor housing 5, wherein, in addition, a sealing element 11, which is designed here as an O-ring, is pre-tensioned or held elastically deformed between the cover 6 and the distributor housing 5. As viewed axially, the inlet connection 7 opens into the distributor housing 5 above the outlet connection 8, i.e. close to the cover 6. A partition wall 13, which extends parallel to the longitudinal extension of the distributor housing 5 or extends axially and ends above the connection 8 forming an intermediate base 14 with the free end face thereof, proceeds from the base 12 of the distributor housing 5, which is opposite the cover 6.

The partition wall 13 forms two chambers 55, 56 in the distributor housing 5, into which one of the outlet connections 8, 9 opens, wherein only outlet connection 8 is visible in FIG. 2. Chambers 55 and 56 make up about two-thirds of the distributor housing 5, while the remaining third is formed by the intermediate base 14 of the distributor housing 5. For this purpose, the partition wall 13 has, at one end, a widened area like a segment of a circle for the remaining third. The intermediate collar 14 extends over the entire circumference of the distributor housing 5, somewhat in the form of a web, along the inside of the housing wall of the distributor housing 5 in order to form a continuous contact surface. The web-shaped section is formed by a step 58 in the distributor housing 5, which is realized by a cross-sectional narrowing of the distributor housing 5. The section is supplemented by the free end face of the partition wall 13. Chambers 55 and 56 thus each extend essentially over 120° of the circular distributor housing 5, while a large part of the intermediate base 14 is also formed by the partition wall 13 using the remaining 120°.

A sealing element 15 rests on the intermediate base 14 and is designed as a profile seal 16, the contour of which corresponds at least essentially to the contour of the intermediate base 14 and is designed to be elastically deformable. The profile seal 16 lies in a U-shaped recess in the intermediate base so that the profile seal 16 is held at the outer and inner edge thereof by a protruding section of the intermediate base 14. The recess 17 thus forms an anti-twist device for the profile seal 16 through the remaining side walls of the intermediate base 14.

A ceramic sealing disc 18 rests on the profile seal 16, wherein the contour of the sealing disc 18 essentially corresponds to the contour of the profile seal 16 or the intermediate collar 14. For this purpose, the sealing disc 18 also has second flow openings 19, which likewise each represent a segment of a circle, which extends over approximately 120°, corresponding to chambers 55 and 56. On the end face facing the cover 6, the sealing disc 18 also has a bearing mount 20, which is designed in the center of the sealing disc 18 as a cylindrical recess, in particular as a cup-shaped recess. In addition, the flow openings 19 are each provided with a chamfer 21 on the same end face, which serve to improve the flow conditions. Advantageously, such chamfers are also provided on the back of the sealing disc 18 in the region of the flow openings 19.

A valve disc 22 is also arranged on the sealing disc 18 as a valve element, which valve disc is also made of ceramic and the outer diameter of which essentially corresponds to the outer diameter of the sealing disc 18. In the present exemplary embodiment, the outer diameter of the valve disc 22 is designed slightly smaller in order to avoid frictional contact with the surface of the inside of the distributor housing 5, as shown in FIG. 2. The valve disc 22 is designed in the shape of a circular segment and extends over a segment of a circle of approximately 240°. The remaining 120° of the valve disc 22 is free and thus formed open at the edge in order to form a flow opening, which sets a flow cross-section when there is an overlap position with at least one of the flow openings 19 of the sealing disc 18. Depending on the rotational position of the valve disc 22, a desired flow cross-section can thus be set between the inlet connection 7 and at least one of the outlet connections 8, 9. The valve disc 22 rests flatly on the sealing disc 18 and is connected to the control shaft 23 already mentioned above in a rotationally fixed manner. For this purpose, the valve disc 22 has a passage 24, which forms an extension of the bearing mount 20 and optionally also has a circular contour and is aligned flush with the bearing mount 21. Optionally, the valve disc 22 is also provided with chamfers or bevels at the flow opening for improved flow behavior.

The control shaft 23, together with the valve disc 22 and a spring element 25, forms a pre-assembled component 27. A free end 28 of the control shaft 23 protrudes through the passage 24 in the valve disc 22—as shown in FIG. 2—in order to engage in the bearing mount 20 or in order to end therein. For this purpose, the free end 28 of the control shaft 23 is also designed in the shape of a circular cylinder, wherein the outer diameter of the free end 28 and the inner diameter of the bearing mount 21 are selected such that together they form a radial plain bearing for the control shaft 23.

An anti-twist device or rotational entrainment element between the control shaft 23 and the valve disc 22 is preferably realized in a form-fitting manner. For this purpose, for example, the control shaft 23 and the valve disc 22 have a polygonal cross-section in the region of the valve disc 22 in order to bring about rotational entrainment. Optionally, the control shaft 23 has one or more radial projections, which engage in axial recesses of the valve disc 22 for the rotational entrainment thereof so that, on the one hand, simple pre-assembly is ensured by means of plugging and, on the other hand, reliable rotational entrainment of the valve disc 22 is ensured.

Figure 3:
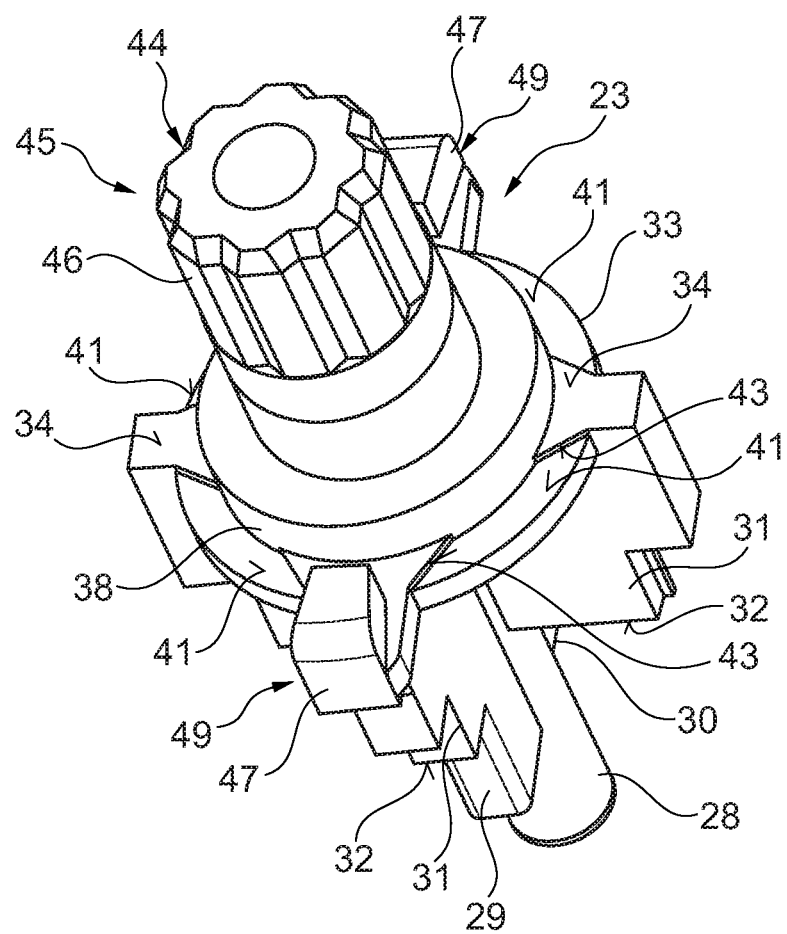
FIG. 3 a perspective detailed view of a control shaft of the rotary valve.

To this end, FIG. 3 shows the control shaft 23 in a perspective view. The control shaft 23 has an asymmetrical cross-sectional contour a distance away from the free end 28. The control shaft 23 has two opposing projections 29, 30 protruding radially from the control shaft 23, which are designed to engage in corresponding radial recesses in the sealing disc 22 or in an intermediate element designed to be complementary thereto, which itself is non-rotatably connected to the sealing disc. The spring element 25, as shown in FIG. 2, is designed as a helical spring. The helical spring is held axially between the sealing disc 22 and several radially projecting support projections 31 of the control shaft 23. The support projections 31 are arranged evenly over the circumference of the control shaft 23 and are formed therewith as a single piece. In particular, in the present case, four corresponding support projections 31 are arranged evenly distributed over the circumference. Two support projections 31 lying opposite one another preferably proceed into the lateral projections 29, 30. The support projections 31 together form a first axial stop 32 for the spring element 25. During pre-assembly, the spring element 25 is pushed onto the control shaft 23 up to the axial stop 32, then the intermediate element and finally the valve disc 22 are optionally pushed onto the control shaft 23 so that the valve disc 22 is non-rotatably connected to the control shaft 23. To lock the pre-assembled component 27 in place, the control shaft 23 and/or the sealing disc 22, or optionally the intermediate element, has elastically deformable clamping ribs, which extend parallel to the longitudinal extension in the form of a web and are designed in such a way that a frictional connection is formed between the control shaft 23 and the sealing disc 22 or the intermediate element, which ensures cohesion of the pre-assembled component against the force of the spring element 25. Optionally, the radial projections for the rotational entrainment are formed by an intermediate element non-rotatably connected to the control shaft 23, which intermediate element is non-rotatably connected to the valve disc 22 by the radial projections.

Furthermore, the control shaft 23 has, on the side of the support projections 31 facing away from the spring element 25, an annular projection 33, which is formed coaxially as relates to the control shaft 23 and is connected thereto as a single piece. The annular projection 33 is a radial projection, which proceeds into the support projections 31 on the end face thereof facing the end 28, and which opposes an annular or sleeve-shaped sealing projection 35 of the housing 4 of the rotary valve 2 on the end face 34 thereof facing away from the end 28, in the installed state. The sealing projection 35 is formed on the cover 6, which in this respect forms a housing wall of the housing 4. As already mentioned, the sealing projection 35 has a circular or annular shape and extends into the housing. It is coaxial as relates to an opening 36 on the cover 6, through which the control shaft 23 is led out of the housing 4 with the other free end 37 thereof. The opening 36 in this case is designed as a bearing opening, through which the control shaft is rotatably mounted on the cover 6.

Figure 4:
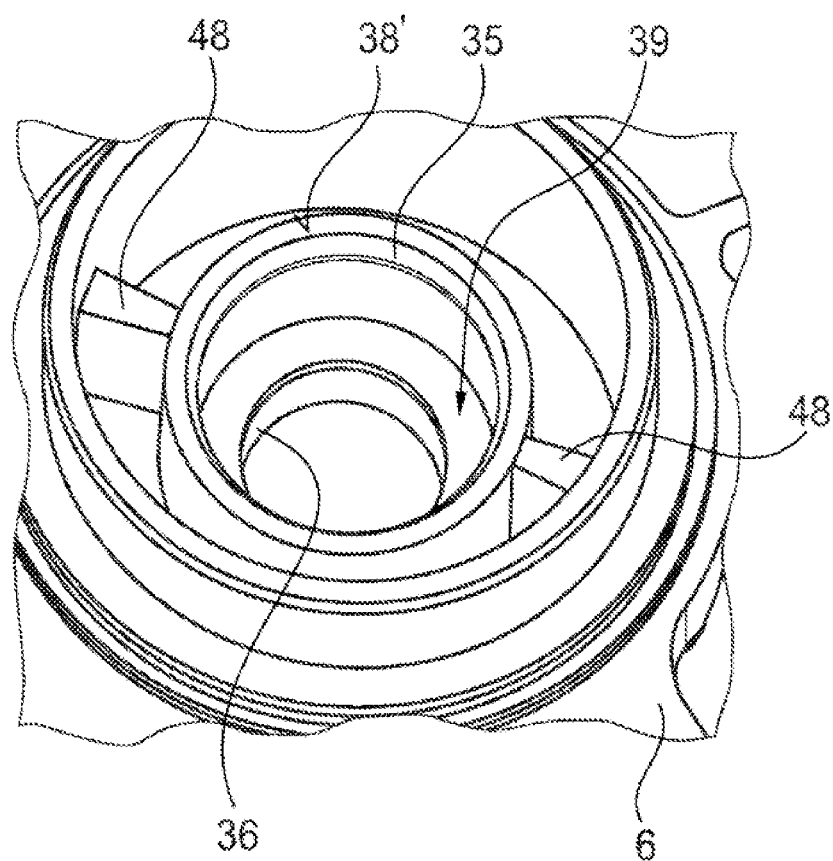
FIG. 4 a perspective detailed view of a housing wall of the rotary valve.

FIG. 4 shows a perspective plan view of the housing cover 6 forming the housing wall with the sealing projection 35. According to the present exemplary embodiment, the sealing projection 35 is formed with the housing cover 6 as a single piece. The sealing projection 35 has an annular contact surface 38', against which the control shaft 23 is pressed with the annular projection 33 thereof by the spring element 25 in the assembled state, as shown in FIG. 2.

Figure 5:
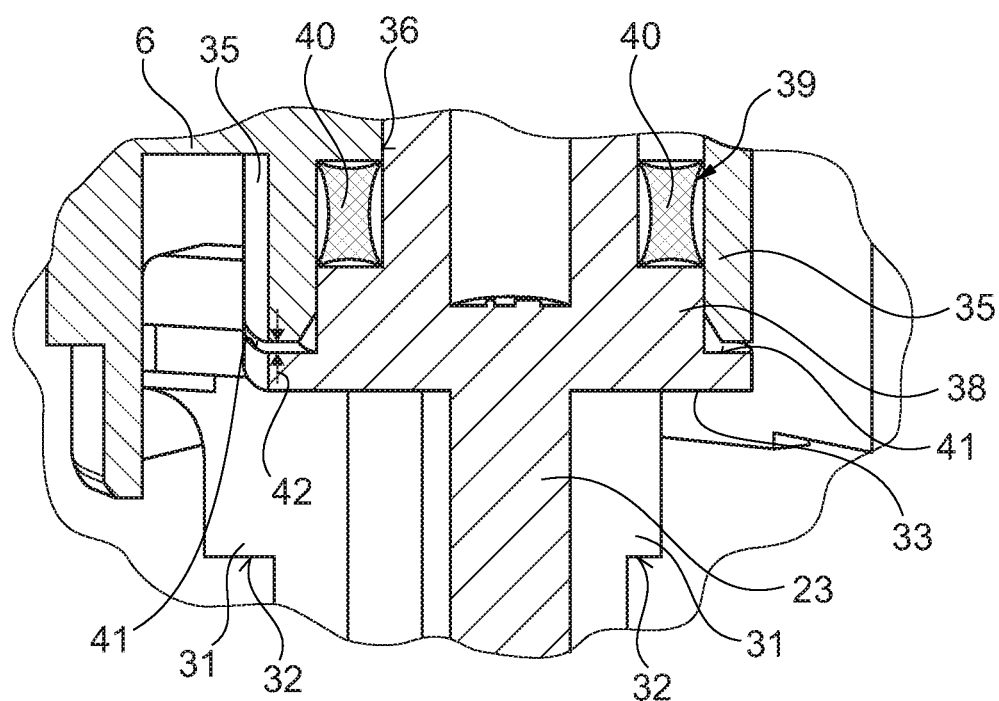
FIG. 5 a further longitudinal sectional view of the rotary valve.

FIG. 5 shows the region of the control shaft 23 on the sealing projection 35 in a further longitudinal sectional view. It can be seen that the control shaft 23 protrudes into the sealing projection 35 with an axial projection 38 protruding axially from the annular projection 33. The outer diameter of the axial projection 38 is slightly smaller than the diameter of the sealing projection 35 so that a narrow gap remains therebetween. In addition, a free space remains between the cover 6 and the axial projection 38 of the control shaft 23, through which axial projection a chamber 39 is formed within the sealing projection 35. The chamber 39 is thus limited by the control shaft, the sealing projection, the housing wall, and the axial projection 38 and/or annular projection 33. There is a sealing element 40, which is elastically deformable, in this chamber 39. In the installed state, the sealing element 40 is elastically deformed or pre-tensioned so that it has a sealing effect between the control shaft 23 and the housing 4. The sealing element ensures that no liquid can escape from the housing to the outside through the opening 36.

As shown in FIG. 3, the annular projection 33, which is opposite the sealing projection 35 or rests axially on the sealing projection 35, has several axial recesses 41, which are evenly distributed over the circumference thereof on the end face 34 thereof facing the sealing projection 35. The axial recesses 41 each extend over a limited circumferential area of less than 90° and protrude to the outer circumference of the annular projection 33 so that they are designed with open edges on the outside and extend inwards to the projection 38 of the control shaft 23. As shown in FIG. 5, this results in an axial gap 42 between the annular projection 33 and the sealing projection 35 in the region of the respective axial recess 41. Due to the advantageous design, it is achieved that medium from the interior of the housing can flow through the axial gap into the chamber 39. This ensures that the sealing element 40 is always exposed to the medium and can therefore also sustainably fulfill its sealing function without, for example, becoming porous or drying out. The medium also serves to lubricate the frictional contact between the control shaft 23 and the sealing element 40 or the cover 6, as a result of which wear is reduced overall.

As can also be seen from FIG. 3, the axial recesses 41 are limited at the circumferential side edges 43 thereof in such a way that the side edges 43 do not extend radially or practically radially outwards with respect to the control shaft 23, but are inclined in relation thereto, so that the axial recesses 41 are tapered more towards the axis of rotation of the control shaft 23 than in a radial extension of the side edges. As a result, the side edges 43 are designed as aprons or vanes, which advantageously propel dirt particles that may have gotten into the gap 42 out of the gap when the control shaft 23 rotates. According to a further exemplary embodiment, not shown here, the side edges 43 extend radially or practically radially, which can result in cost advantages in production.

The control shaft 23 also has a polygonal shape as a rotational entrainment element 44 at the end 37 leading through the opening 36, which rotational entrainment element forms a coupling end 45 of the control shaft 23. Due to the polygon formation, the coupling end 45 has external teeth 46, which can be coupled to or brought into operative connection with the actuator 3. In particular, the actuator 3 can be slid onto the cover, wherein the coupling end 45 is connected to the gear of the actuator 3 at the same time.

Optionally, the control shaft 23 also has one or more radial projections 47, as shown in FIG. 3, each of which lie between two adjacent axial recesses 41 and protrude radially beyond the annular projection 33. The radial projections 47 are designed to interact as a rotation stop 49 with stops 48 located in the housing outside of the projection and fixed to the housing, as shown in FIG. 4. As a result, the angle of rotation of the control shaft 23 is advantageously limited so that incorrect assembly is prevented, and simple adjustment of the actuator 3 is made possible by the form-fitting limitation of rotation.

While the rotary valve 2 is designed as a disc valve according to the present exemplary embodiment, it is provided, according to the further exemplary embodiment, that the rotary valve is designed as a rotary piston valve. This differs from the disc valve essentially in that the valve element is designed as a valve piston, which is designed, for example, as a hollow cylinder and has flow openings in the casing wall thereof, which interact with the connections of the valve.

The invention claimed is:
1. A rotary valve comprising:
a housing which has at least one inlet connection and at least one outlet connection for a liquid and/or gaseous medium, at least one valve element which is rotatably mounted in the housing, between the connections, to set at least one desired flow cross-section, a control shaft which is non-rotatably connected to the valve element, wherein the control shaft is led out of the housing with a coupling end through an opening in a housing wall of the housing, wherein the control shaft has an annular projection which has an axial stop for axial contact with an annular sealing projection of the housing wall, and with at least one sealing element acting between the control shaft and the housing, wherein the annular projection is continuous in a circumferential direction, wherein a chamber is formed between the annular projection, the control shaft, the housing wall, and the sealing projection, in which chamber the sealing element is located, wherein the control shaft protrudes into the sealing projection with an axial projection protruding axially from the annular projection in order to limit the chamber, wherein an outer diameter of the axial projection is smaller than a diameter of the sealing projection so that a gap remains therebetween, wherein the annular projection comprises an end face facing the sealing projection, wherein the annular projection has at least one axial recess extending in an axial direction into the annular projection away from the annular sealing projection from the end face into a bottom surface within the annular projection, and wherein the at least one axial recess extends over a circumferential section of the end face up to the radial outer edge of the annular projection and up to the axial projection so that the medium can reach the chamber.

2. The rotary valve according to claim 1, wherein the annular projection has several axial recesses on the end face thereof, which axial recesses are distributed evenly with respect to one another.

3. The rotary valve according to claim 1, wherein the annular projection has at least three axial recesses.

4. The rotary valve according to claim 1, wherein the annular projection has four or more than four axial recesses.

5. The rotary valve according to claim 1, wherein the respective axial recess has side edges limiting the axial recess in the circumferential direction, which side edges are aligned radially in relation to the control shaft.

6. The rotary valve according to claim 1, wherein the respective axial recess has side edges limiting the axial recess in the circumferential direction, wherein the side edges are formed to increasingly limit the axial recess in the radial direction towards the control shaft.

7. The rotary valve according to claim 6, wherein the side edges extend in a straight line.

8. The rotary valve according to claim 6, wherein the side edges have at least one curvature.

9. The rotary valve according to claim 1, wherein the annular projection has at least one rotation stop, which is designed to interact with a housing-fixed stop to limit a rotational range of the control shaft.

10. The rotary valve according to claim 1, wherein the rotation stop is arranged between two of the axial recesses, as viewed in the circumferential direction.

11. The rotary valve according to claim 1, wherein the rotation stop projects radially as a radial projection over the annular projection.

12. The rotary valve according to claim 1, wherein the housing-fixed stop is arranged on the housing wall.

13. The rotary valve according to claim 1, wherein the rotary valve is designed as a disc valve with a valve disc as the valve element or as a rotary piston valve with a rotary piston as the valve element.

* * * * *